(12) United States Patent
Ginter et al.

(10) Patent No.: US 8,069,654 B2
(45) Date of Patent: Dec. 6, 2011

(54) OPTIMIZED RHODIUM USAGE IN LNT SCR SYSTEM

(75) Inventors: David Mark Ginter, Northville, MI (US); James Edward McCarthy, Jr., Canton, MI (US)

(73) Assignee: Eaton Corporation, Cleveland, OH (US)

( * ) Notice: Subject to any disclaimer, the term of this patent is extended or adjusted under 35 U.S.C. 154(b) by 1360 days.

(21) Appl. No.: 11/653,745

(22) Filed: Jan. 16, 2007

(65) Prior Publication Data
US 2008/0168763 A1   Jul. 17, 2008

(51) Int. Cl.
*F01N 3/00* (2006.01)
(52) U.S. Cl. ............ 60/286; 60/274; 60/295; 60/297; 60/301; 60/303
(58) Field of Classification Search .......... 60/274, 60/276, 285, 286, 295, 297, 301, 303; 123/1 A, 123/3, DIG. 12; 48/61, 197 R, 198.3, 198.7, 48/198.8
See application file for complete search history.

(56) References Cited

U.S. PATENT DOCUMENTS

| | | | |
|---|---|---|---|
| 5,974,793 A | 11/1999 | Kinugasa et al. | |
| 6,109,024 A | 8/2000 | Kinugasa et al. | |
| 6,732,507 B1 | 5/2004 | Stanglmaier et al. | |
| 7,082,753 B2 * | 8/2006 | Dalla Betta et al. | 60/286 |
| 7,213,395 B2 * | 5/2007 | Hu et al. | 60/286 |
| 7,389,638 B2 * | 6/2008 | Weissman et al. | 60/295 |
| 7,412,823 B2 * | 8/2008 | Reuter et al. | 60/286 |
| 7,669,408 B2 * | 3/2010 | McCarthy et al. | 60/286 |
| 7,673,447 B2 * | 3/2010 | Gaiser | 60/289 |
| 2003/0101713 A1 | 6/2003 | Dalla Betta et al. | |
| 2004/0050037 A1 | 3/2004 | Betta et al. | |
| 2004/0076565 A1 | 4/2004 | Gandhi et al. | |
| 2006/0010857 A1 | 1/2006 | Hu et al. | |

FOREIGN PATENT DOCUMENTS
WO   WO 2004/090296 A1   10/2004

OTHER PUBLICATIONS

Theis et al., "The Effects of Aging Temperature and PGM Loading on the NOX Storage Capacity of a Lean NOX Trap", *SAE Technical Paper Series*, 2005-01-1117 (2005).
Elwart et al., H2S Suppression During the Desulfation of a Lean NOX Trap with a Nickel-Containing Catalyst, *SAE Technical Paper Series*, 2005-01-1116 (2005).

(Continued)

*Primary Examiner* — Tu Nguyen
(74) *Attorney, Agent, or Firm* — Paul V. Keller

(57) ABSTRACT

Rhodium utilization in LNT/SCR-based exhaust after treatment systems for medium and heavy duty trucks is reduced by operating inline fuel reformers in a certain manner. The fuel processors are operated at steam reforming temperatures to produce a reformate-containing exhaust having a hydrogen to CO ratio of at least about 3:2 or at least about 3% hydrogen, This generally involves operating the fuel reformers at temperatures from about 500 to about 625° C. and with an overall fuel to air ratio from about 1.10 to about 1.40. In this manner, regeneration can be efficiently carried out while limiting the catalyst loading of the fuel processors to no more than about 1.0 grams rhodium per liter maximum displacement of the diesel engine and the catalyst loading of the LNTs to no more than about 0.50 grams rhodium per liter maximum displacement of the diesel engine.

18 Claims, 3 Drawing Sheets

OTHER PUBLICATIONS

Narula et al., "Combining Theory and Experiments in Studies of Structured Changes in LNT Materials", *Eighth DOE Crosscut Workshop on Lean Emissions Reduction Simulation* (May 17-19, 2004).

Hoard et al., "Economic Comparison of LNT Versus Urea SCR for Light Duty Diesel Vehicles in US Market", *2004 Deer Conference*, (Aug. 29-Sep. 2, 2004).

Hoard et al., "Economic Comparison of LNT Versus Urea SCR for Light Duty Diesel Vehicles in US Market" (2004).

Ura et al., "Laboratory Studies of Lean NOX Trap Desulfation Strategies", *SAE Technical Paper Series*, 2005-01-1114 (2005).

Daw et al. "Practical Issues in Characterizing LNT Materials", *8th CLEERS Workshop*, (May 17-19, 2005).

Todd, "Lean NOX Trap Deactivation", Oak Ridge National Laboratory US DOE (May 2005).

Huff et al., "Measurement and Characterization of LNT Regeneration", *9th CLEERS Workshp*, (May 2006).

Xu et al., The Study of an Alumina-Based Lean NOX Trap (LNT) for Diesel, *9th CLEERS Workshop*, (May 2006).

* cited by examiner

OPTIMIZED RHODIUM USAGE IN LNT SCR SYSTEM

FIELD OF THE INVENTION

The present invention relates to diesel power generation systems with exhaust aftertreatment.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches remove NOx from the vehicle exhaust. These include the use of lean-burn $NO_x$ catalysts, selective catalytic reduction (SCR) catalysts, and lean $NO_x$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. A reductant such as diesel fuel must be steadily supplied to the exhaust for lean NOx reduction, introducing a fuel economy penalty of 3% or more. Currently, peak NOx conversion efficiencies for lean-burn NOx catalysts are unacceptably low.

SCR generally refers to selective catalytic reduction of NOx by ammonia. The reaction takes place even in an oxidizing environment. The NOx can be temporarily stored in an adsorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

To clarify the state of a sometime ambiguous nomenclature, it should be noted that in the exhaust aftertreatment art, the terms "SCR catalyst" and "lean NOx catalyst" are occasionally used interchangeably. Where the term "SCR" is used to refer just to ammonia-SCR, as it often is, SCR is a special case of lean NOx catalysis. Commonly when both types of catalysts are discussed in one reference, SCR is used with reference to ammonia-SCR and lean NOx catalysis is used with reference to SCR with reductants other than ammonia, such as SCR with hydrocarbons.

LNTs are devices that adsorb NOx under lean exhaust conditions and reduce and release the adsorbed NOx under rich conditions. A LNT generally includes a NOx adsorbent and a catalyst. The adsorbent is typically an alkaline earth compound, such as $BaCO_3$ and the catalyst is typically a combination of precious metals including Pt and Rh. In lean exhaust, the platinum catalyst speeds oxidizing reactions that lead to NOx adsorption. In a reducing environment, the catalysts activate reactions by which hydrocarbon reductants are converted to more active species, activate the water-gas shift reaction, which produces more active hydrogen from less active CO, and activate reactions by which adsorbed NOx is reduced and desorbed. In a typical operating protocol, a reducing environment will be created within the exhaust from time-to-time to regenerate (denitrate) the LNT.

A LNT can produce ammonia during denitration. Accordingly, it has been proposed to combine LNT and ammonia-SCR catalysts into one system. Ammonia produced by the LNT during regeneration is captured by the SCR catalyst for subsequent use in reducing NOx, thereby improving conversion efficiency over a stand-alone LNT with no increase in fuel penalty or precious metal usage. U.S. Pat. No. 6,732,507 describes such a system. U.S. Pat. Pub. No. 2004/0076565 describes such a system wherein LNT and SCR components are interleaved or co-disbursed over one substrate.

The present invention concerns the use of catalysts in LNT-based medium and heavy duty diesel truck exhaust aftertreatment systems. The catalyst requirements for LNT based-systems treating lean burn engine exhaust or diesel automotive exhaust are generally less stringent than those for treating medium and heavy duty diesel truck exhaust. Diesel exhaust is cooler than gasoline engine exhaust. Exhaust from larger diesel engines is cooler than exhaust from smaller diesel engine. At lower temperatures, reactions are generally slower and require more catalyst.

The LNT catalyst requirement depends on whether exhaust valves are used. Exhaust valves can be used to cut exhaust flow to an LNT during regeneration, rerouting the bulk or all of the exhaust flow until regeneration is complete. The precious metal catalyst requirements of LNT systems with valves may be less than those of otherwise comparable systems without valves. The valves permit the residence time of the reducing agent in the LNT during regeneration to be greatly increased. Also, the valves allow the environment within the LNT during regeneration to be easily controlled, Exhaust valves, however, are prone to failure and the present invention focuses on systems that do not require valves.

When valves are not used, regeneration involves eliminating most of the oxygen from the exhaust. Eliminating most of the oxygen from diesel engine exhaust generally involves injecting a reducing agent into the exhaust. The reducing agent reacts with oxygen and substantially consumes it. The reactions between reductant and oxygen can take place in the LNT, but it is generally preferred for the reactions to occur in a catalyst upstream of the LNT, whereby the heat of reaction does not cause large temperature increases within the LNT at every regeneration.

WO 2004/090296 describes a diesel automotive exhaust treatment system with a fuel reformer configured within an exhaust line upstream from LNT and SCR catalysts. The reformer has a high thermal mass. The reformer uses Pt and Rh to produce syn gas from diesel fuel at exhaust gas temperatures. For the reformer to be operative at exhaust gas temperatures, a relatively large amount of catalyst must be used.

U.S. Pat. Pub. No. 2004/0050037 (hereinafter "the '037 publication") describes a different type of fuel reformer placed in the exhaust line upstream from an LNT. The reformer includes both oxidation and steam reforming catalysts. The reformer both removes excess oxygen and converts the diesel fuel reductant into more reactive reformate. Pt and/or Pd serves as the oxidation catalyst. Rh serves as the reforming catalyst.

The inline reformer of the '037 publication is designed to be rapidly heated and to then catalyze steam reforming. Temperatures from about 500 to about 700° C. are said to be required for effective reformate production by this reformer. These temperatures are substantially higher than typical diesel exhaust temperatures. The reformer is heated by injecting fuel at a rate that leaves the exhaust lean, whereby the injected fuel combusts to generate heat. After warm up, the fuel injection rate is increased to provide a rich exhaust.

The industry has found an apparent requirement for rhodium for valveless LNT-based diesel exhaust aftertreatment systems for trucks configured for regeneration using diesel fuel injected into the exhaust line. Without rhodium, NOx conversion efficiencies during LNT regenerations within the lower extent of the exhaust temperature range have been found to be unacceptably low. The rhodium is needed to produce more reactive substances from CO and large hydrocarbon molecules. As a result, rhodium prices have become very high.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations

SUMMARY

The inventors' concepts relate to diesel power generation systems with exhaust aftertreatment. The exhaust aftertreatment systems are of the type that use one or more LNTs to absorb NOx from lean exhaust. To regenerate the LNTs, diesel fuel is injected into the exhaust and processed within the exhaust line using one or more fuel processors. The fuel processors have precious metal catalysts in effective amounts to catalyze steam reforming at 600° C. The LNTs have effective amounts of precious metal catalysts to catalyze NOx adsorption and reduction reactions at about 275° C. The overall amount of precious metal catalyst usage by the system is nevertheless limited. In particular, the fuel processors collectively have no more than about 1.0 grams rhodium per liter maximum displacement of the diesel engine and the LNTs collectively have no more than about 0.50 grams rhodium per liter maximum displacement of the diesel engine. Regeneration efficiency is maintained in spite of the low catalyst loadings by operating the fuel processors at elevated, yet limited temperatures and with a relatively low fuel to air ratio. Preferably, the fuel processors are operated at temperatures from about 500 to about 625° C. and with a overall fuel to air ratio from about 1.10 to about 1.40. Preferably, the fuel processors produce a reformate-containing exhaust having a hydrogen to CO ratio of at least about 3:2. Preferably, the reformate contain exhaust comprises at least about 3% hydrogen. If these reformate composition and concentration criteria are met, efficient LNT regeneration can be maintained at LNT temperatures of 275° C. or less, which commonly occur in medium duty and heavy duty diesel engine exhaust. The exhaust after treatment systems also comprise SCR catalysts, whereby reduction of NOx to $NH_3$ during LNT regeneration is desirable.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

Figure 1:
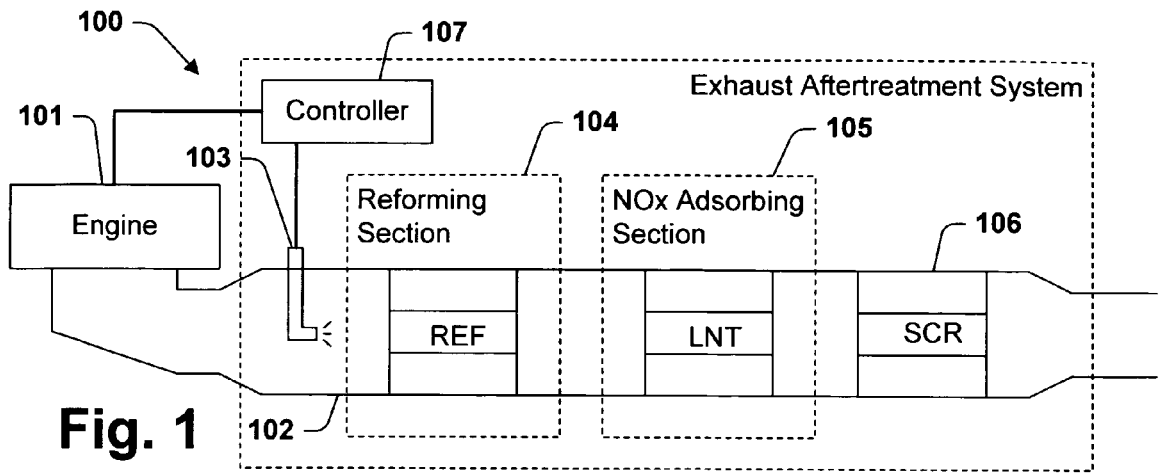
FIG. 1 is a schematic illustration of an exemplary power generation system.

The inventors' concepts are applicable to diesel power generation systems such as the exemplary power generation system 100 schematically illustrated by FIG. 1. The exemplary power generation system 100 comprises a diesel engine 101, an exhaust line 102, an exhaust line fuel injector 103, a fuel reforming section 104, a NOx adsorbing section 105, an SCR catalyst 106, and a controller 107. The exhaust line 102 receive the exhaust from the engine 101 and contains the fuel reforming section 104, the NOx adsorbing section 105, and the SCR catalyst 106. The exhaust line fuel injector 103 is configured to inject diesel fuel into the exhaust line 102 upstream from the fuel reforming section 104. The NOx adsorbing section 105 comprises one or more LNTs. The fuel reforming section 104 comprises one or more fuel processing catalysts.

The engine 101 is generally a medium or heavy duty diesel engine. The inventors' concepts are applicable to light duty diesel and lean burn gasoline power generation systems, but the problems addressed by the inventors do not always occur in these systems. Minimum exhaust temperatures from lean burn gasoline engines are generally higher than minimum exhaust temperatures from light duty diesel engines, which are generally higher than minimum exhaust temperatures from medium duty diesel engines, which are generally higher than minimum exhaust temperatures from heavy duty diesel engines. Lower exhaust temperatures require more catalyst for a given level of LNT regeneration performance. A medium duty diesel engine is one with a displacement of at least about 4 liters, typically about 7 liters. A heavy duty diesel engine is one with a displacement of at least about 10 liters, typically from about 12 to about 15 liters.

The exhaust line 102 is provided with an exhaust line fuel injector 103 to create rich conditions for LNT regeneration. The inventors' concepts are applicable to other method's of creating a reducing environment for regenerating the LNTs of the NOx adsorbing section 105, but the catalyst requirements addressed by the inventors' concepts do not always occur when other methods of creating a reducing environment are used. For example, less catalyst is required within the exhaust line if diesel fuel is injected into the exhaust within the engine cylinders, whereby high temperatures within the cylinders can decompose the diesel fuel. Less catalyst is also required if lighter reductants, such as propane, are injected into the exhaust line instead of diesel fuel. Nevertheless, it is preferred that the reductant is the same diesel fuel used to power the engine 101. It is also preferred that the reductant be injected into the exhaust line 102, rather than into the cylinders of engine 101, in order to avoid oil dilution caused by fuel passing around piston rings and entering the oil gallery. Additional disadvantages of cylinder reductant injection include having to alter the operation of the engine 101 to support LNT regeneration, excessive dispersion of pulses of reductant, forming deposits on any turbocharger configured between the engine 101 and the exhaust line 102, and forming deposits on any EGR valves.

The exhaust line 102 is preferably configured without exhaust valves or dampers. In particular, the exhaust line 102 is preferably configured without valves or dampers that could be used to vary the distribution of exhaust among a plurality of LNTs making up the NOx adsorbing section 105. The inventors' concepts are applicable to aftertreatment systems with exhaust valves or dampers, but the catalyst requirements addressed by the inventors' concepts are less when exhaust valves or dampers are used in that catalyst requirements can be reduced using exhaust valves or dampers. By reducing the exhaust flow to a fuel processor or LNT, the residence time can be increased. Increasing the residence time allows a greater extent of reaction to be achieved for a given catalyst loading. Nevertheless, it is preferred that the exhaust line 102 be configured without valves or dampers because these moving parts are subject to failure and can significantly decrease the durability and reliability of an exhaust aftertreatment system.

Even when the exhaust line 102, which contains the entire fuel reforming section 104 and the entire NOx adsorbing section 105, is free from exhaust valves or dampers, an exhaust line upstream of the exhaust line 102 may still contain an exhaust valve, such as an exhaust gas recirculation (EGR) valve in an EGR line. Exhaust valves are particularly problematic when they are configured within a main exhaust line to divert a majority of the exhaust flow as compared to exhaust valves configured to control the flow through a side branch off a main exhaust line. Exhaust valves for larger conduits are more subject to failure than exhaust valves for smaller conduits.

The inventor's concepts include the use of a fuel reforming section 104 comprising one or more fuel processors. The fuel processors comprise effective amounts of precious metal catalysts, including rhodium, to catalyze oxidation and steam reforming reactions at 600° C. These fuel processors are designed with low thermal mass, whereby they can be easily heated to steam reforming temperatures for each LNT regeneration. Low thermal mass is typically achieved by constructing the reformers using thin metal substrates. A thin metal substrate has a thickness that is about 100 µm or less, preferably about 50 µm or less, and still more preferably about 25 µm or less.

Steam reforming temperatures are at least about 500° C., which is generally above diesel exhaust temperatures. Diesel exhaust temperatures downstream from the turbocharger vary from about 110 to about 550° C. Preferably, the fuel processors can be warmed up and operated using diesel fuel from the injectors 103 stating from an initial temperature of 275° C. while the exhaust from the engine 101 remains at 275° C. More preferably, the fuel processors can be warmed up and operated from initial exhaust and reformer temperatures of 225° C., and still more preferably from exhaust and reformer temperatures of 175° C. These properties are achieved by providing the fuel processors with effective amounts of precious metals, such as Pt and/or Pd, for catalyzing oxidizing diesel fuel at the starting temperatures.

Having the fuel processors operate at steam reforming temperatures, reduces the total amount of precious metal catalyst required. Less precious metal catalyst is required when reforming at steam reforming temperatures as compared to reforming diesel fuel at exhaust temperatures regardless of whether reforming is through partial oxidation and stream reforming or exclusively though partial oxidation reactions.

Having the fuel processors operate at least partially through steam reforming reactions significantly increases the reformate yield and reduces the amount of heat generation. In principal, if reformate production proceeds through partial oxidation reforming as in the reaction:

$$CH_{1.85}+O_2 \rightarrow CO_2+0.925\,H_2 \quad (1)$$

0.925 moles of reformate (moles CO plus moles $H_2$) could be obtained from each mole of carbon atoms in the fuel. $CH_{1.85}$ is used to represent diesel fuel having a typical carbon to hydrogen ratio. If reformate production proceeds through steam reforming as in the reaction:

$$CH_{1.85}+H_2O \rightarrow CO+1.925\,H_2 \quad (2)$$

2.925 moles of reformate (moles CO plus moles $H_2$) could in principle be obtained from each mole of carbon atoms in the fuel. In practice, yields are lower than theoretical amounts due to the limited efficiency of conversion of fuel, the limited selectivity for reforming reactions over complete combustion reactions, the necessity of producing heat to drive steam reforming, and the loss of energy required to heat the exhaust. Preferably, the fuel processors comprise enough steam reforming catalyst that at 600° C., with an 8 mol % exhaust oxygen concentration from the engine 101 and with sufficient diesel fuel to provide the exhaust with an overall fuel to air ratio of 1.2:1, at least about 2 mol % reformate is generated by steam reforming, more preferably at least about 4 mol %, and still more preferably at least about 6 mol %. For purposes of this disclosure, functional descriptions involving diesel fuel are tested on the basis of the No. 2 diesel fuel oil sold in the United States, which is a typical diesel fuel.

Preferably, the fuel processors operate nearly auto-thermally during LNT regeneration. Nearly auto-thermal operation means the reformers heat at half or less the rate they would if they operated entirely by partial oxidation reforming, more preferably one quarter or less. Note that if some of the fuel combusts and some of the fuel reforms by partial oxidation reactions, the heating rate can be even higher than for pure partial oxidation reforming. Thus the effect of steam reforming on reforming heating rates cannot always be seen from temperature effects alone.

Overall fuel to air ratios are determined by considering the amount of oxygen in air and the amount of fuel that can be completely combusted using that air. A stoichiometric amount of fuel gives a fuel to air ratio of 1:1. The amount of fuel is the total of the fuel injected into the engine 101 and the fuel injected into the exhaust line 102. This ratio is sometime represented by the symbol phi.

The fuel processing catalysts are required to have sufficient precious metal catalysts that they are functional to convert a relatively large fraction of diesel fuel in the exhaust to reformate when they are at 600° C., the exhaust from the engine 101 has an 8% oxygen concentration, and the exhaust contains sufficient diesel fuel to provide the exhaust with an overall fuel to air ratio of 1.2:1. Preferably, at least about 40% of the injected diesel fuel in excess of that required to make up a 1:1 overall phi is converted to reformate under these conditions, more preferably at least about 50%, and still more preferably at least about 60%. Obviously, the fuel processing catalysts are expected to work at other conditions. The specific conditions described here are provided to give additional context for the conversion targets.

A discovery of the inventors is that if the fuel processors are operated in a certain matter, acceptable performance from the NOx adsorbing section 105 can be obtained with less rhodium than would otherwise be required. According to the inventors', the fuel processors are operated to produce a reformate containing exhaust with a relatively high hydrogen concentration and/or a relatively high $H_2$ to CO ratio. A relatively high concentration of hydrogen is a least about 3%, more preferably at least about 5%. A relatively high $H_2$ to CO ratio is at least about 3:2, more preferably at least about 2:1.

Figure 5:
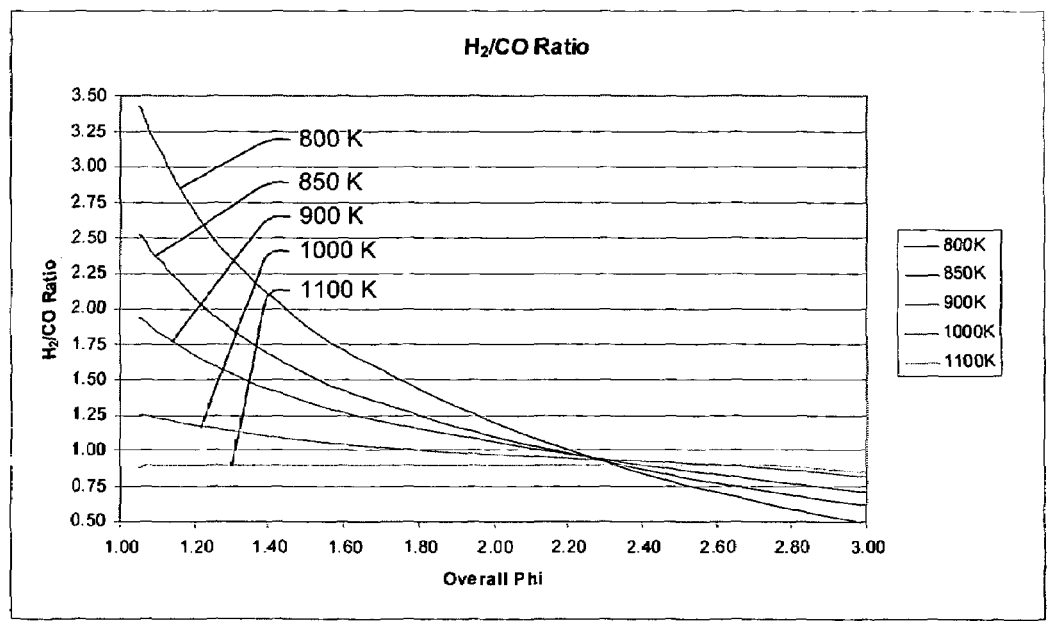
FIG. 5 is a plot of hydrogen to CO equilibrium ratios as a function of fuel to air ratio at several temperatures.
Figure 6:
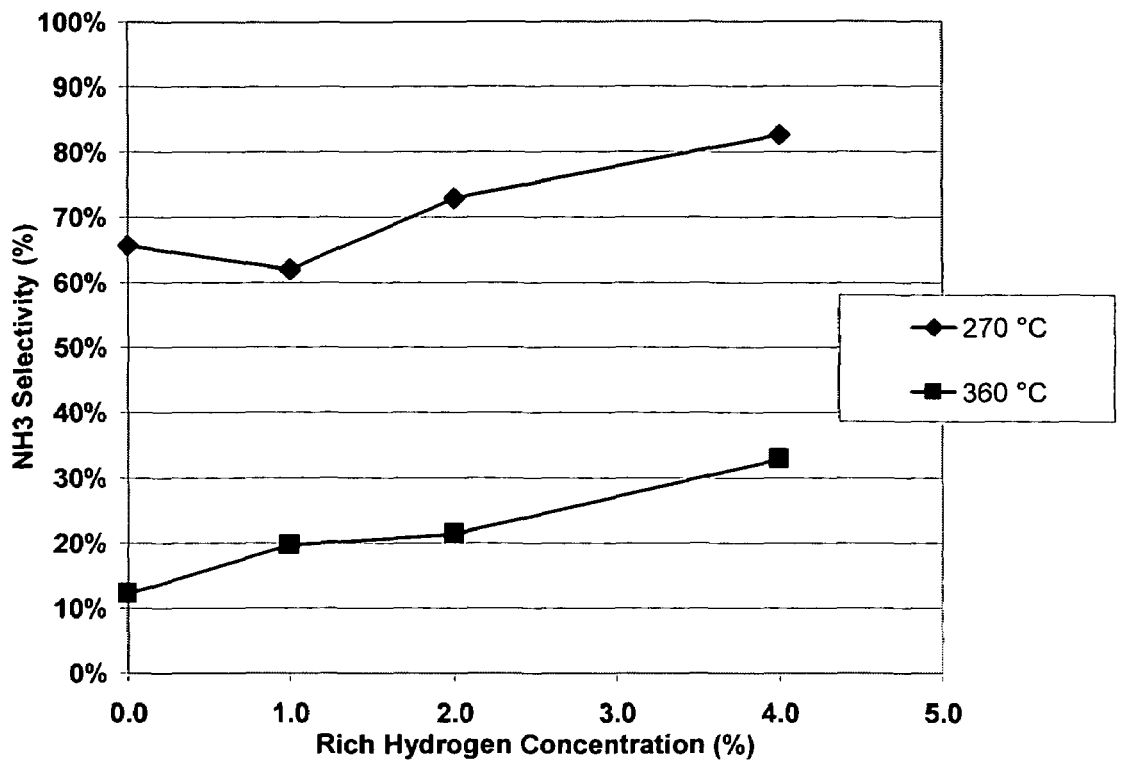
FIG. 6 is a plot showing ammonia selectivity during LNT regeneration for different temperatures and hydrogen concentrations.

In order to achieve a high hydrogen concentration and a high concentration of hydrogen relative to CO, the fuel processors are preferably operated at relatively low temperatures and at relatively low fuel to air ratios. FIG. 5 shows the equilibrium between hydrogen and CO at various temperatures and phi values. FIG. 6 shows that high hydrogen and CO are favored by lower temperatures and lower phi values. Preferably, the phi value is from about 1.1 to about 1.4, more preferably from about 1.20 to about 1.32. Preferably the temperature is from about 500 to about 625° C., more preferably from about 550 to about 600° C.

The reformate can be further processed downstream from the reformers. For example, a water-gas shift catalyst can be configured between the LNTs and fuel processors. Preferably, however, the hydrogen concentration and hydrogen to CO ratios referred to in the preceding paragraph are achieved within the fuel processing catalysts, whereby additional processing and additional catalysts are not required. Preferably, the hydrogen concentration and hydrogen to CO ratios are achieved at temperatures in excess of 500° C. Equilibrium favors hydrogen formation at lower temperature, but more catalyst is required to bring about the water-gas shift reaction as the temperature becomes progressively lower.

Figure 7:
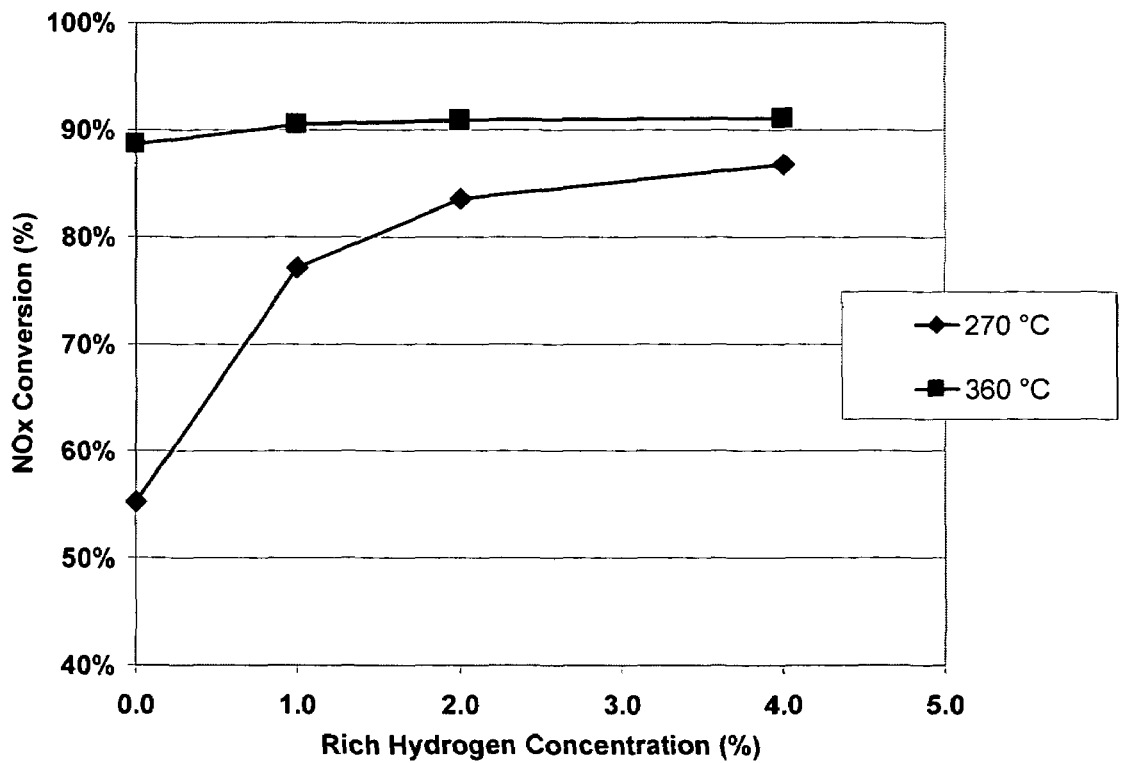
FIG. 7 is a plot showing NOx conversions during LNT regeneration for different temperatures and hydrogen concentrations.

FIG. 7 shows the effect of hydrogen concentration on the NOx conversion efficiency of an LNT with relatively low rhodium loading at 270 and 360° C. At the lower temperature, the conversion of NOx released by the LNT increases with increasing hydrogen concentration. Below 2% hydrogen concentration, the conversion efficiency is unacceptably low. At 360° C., the conversion efficiency is relatively high regardless of hydrogen concentration. In general, high conversion efficiencies are easily achieved at 360° C. with or without rhodium and with or without high hydrogen concentrations. The inventors concept is concerned with achieving high efficiencies at lower LNT temperatures without the use of a large amount of rhodium. High NOx conversion efficiencies at low LNT temperatures are obtained with relatively high hydrogen concentrations, or high proportions of hydrogen to CO, preferably both.

FIG. 6 show the effects of hydrogen concentration and LNT temperature on selectivity of conversion of NOx to ammonia when a relatively low loading of rhodium is used. At 270° C., the selectivity to ammonia is high. Accordingly, the inventors' contemplate that one or more SCR catalysts will be used in conjunction with the LNTs in order to allow high conversion of stored NOx to $N_2$ when LNTs with low rhodium loading are regenerated at relatively low temperatures, such as 270° C. The ammonia can be adsorbed and stored in the SCR reactor and reduced to $N_2$ by reaction with NOx slipping past the LNTs during subsequent lean phases.

Preferably, the total amount of precious metal used by the fuel processing section 104 is no greater than about 5.0 g per liter maximum displacement of the engine 101. Preferably, the amount of catalyst is no greater than about 3.0 g per liter. The bulk of this catalyst is preferably Pd. The amount of rhodium is preferably no greater than about 1.0 g per liter maximum displacement of the engine 101, preferably no greater than about 0.75 g per liter maximum displacement of the engine 101, still more preferably no greater than about 0.5 g per liter maximum displacement of the engine 101.

The overall size of the fuel processors in the fuel reforming section 104 is preferably small to facilitate rapid heating. Preferably, the total volume of the fuel processors is about 60% of the engine displacement or less, more preferably about 50% of the engine displacement or less. The fuel processors are generally heated by injecting fuel into the exhaust line 102 at a rate that leaves the exhaust lean, whereby the injected fuel combusts generating heat within the fuel processors. The fuel processing section may comprise one or more catalyst bricks. Multiple catalyst bricks can be configured in series or in parallel. Parallel fuel processing catalysts can be operated simultaneously or alternately.

An LNT is a device that adsorbs NOx under lean exhaust conditions and reduces and releases NOx under rich exhaust conditions. An LNT as defined herein comprises a NOx adsorbent and a precious metal catalyst in intimate contact on the surfaces of a porous support. The support is typically a monolith, although other support structures can be used. The monolith support is typically ceramic, although other materials such as metal and SiC are also suitable for LNT supports. The supported catalyst volume of the LNTs collectively is typically from about one to about four times the engine displacement. The supported catalyst volume is the volume of the support, which includes voids within the support and the volume occupied by the adsorbent and catalyst. Preferably, the total supported catalyst volume of all the LNTs in the NOx adsorbing section 105 is no greater than about two times the maximum displacement of the engine 101.

The LNTs of the NOx adsorbing section 105 can comprise any suitable NOx-adsorbing material. Examples of NOx adsorbing materials include oxides, carbonates, and hydroxides of alkaline earth metals such as Mg, Ca, Sr, and Ba or alkali metals such as K or Cs.

The total precious metal loading of LNTs in the NOx adsorbing section is preferably no more than about 4.0 g per liter maximum engine displacement, more preferably no more than about 3.0 g per liter, and still more preferably no more than about 2.0 g per liter.

The total rhodium loading of the LNTs in the NOx adsorbing section is preferably no more than about 0.50 g per liter maximum engine displacement, more preferably no more than about 0.35 g per liter, and still more preferably no more than about 0.25 g per liter. On other hand, some rhodium is preferably used to achieve efficient regeneration at low temperatures. Preferably, at least about 0.10 g rhodium is used in the LNTs per liter maximum engine displacement. Preferably, the amount of catalyst is sufficient to be effective to utilize at least about 50% of the CO in the exhaust when regenerating under rich conditions at 300° C., more preferably sufficient to utilize at least about 80% of the CO.

The total rhodium usage of the power generation system 100 is preferably limited to no greater than about 1.5 g rhodium per liter maximum engine displacement, more preferably to no greater than about 1.25 g rhodium per liter maximum engine, still more preferably to no greater than about 1.0 g rhodium per liter maximum engine, and even more preferably no greater than about 0.7 g rhodium per liter maximum engine. The rhodium is generally used to greater effect in the fuel processors than in the LNTs. Accordingly, it is preferred that the fuel processors collectively use at least about 1.5 times as much rhodium as the LNTs collectively, although typically no more than about four times as much. By distributing the rhodium in this manner, and operating the reformers as described herein, the overall rhodium usage limits can be met while still achieving acceptable regeneration performance at low LNT temperatures.

The overall efficiency of the exhaust aftertreatment system 100 must also be acceptable in terms of fuel penalty. The fuel penalty is the amount of fuel that must be used to regenerate the LNTs in the NOx adsorbing section 104 in relation to the amount of fuel required to operate the power generation system 100, The fuel penalty is preferably less than 5%, more preferably less than 3%, and still more preferably less than 2%. By using a sufficient amount of catalyst, the exhaust aftertreatment system can meet these limitations.

The efficiencies discussed above are in relation to aged catalysts. As exhaust treatment catalyst age, their efficiencies decrease substantially. Accordingly, catalyst loading must be selected with reference to aged catalysts. For purposes of this description, an aged LNT is one that has been desulfated at least about 50 times.

The SCR catalyst 106 is functional to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Mo, W, and Ce, zeolites, such as ZSM-5 or ZSM-11, substituted with metal ions such as cations of Cu, Co, Ag, or Zn. SCR can be accomplished using precious metals, but preferably the SCR catalyst 106 is substantially free of precious metals. Preferably, the ammonia-SCR catalyst 106 is designed to tolerate temperatures required to desulfate the LNTs of the NOx adsorbing section 105.

Figure 2:
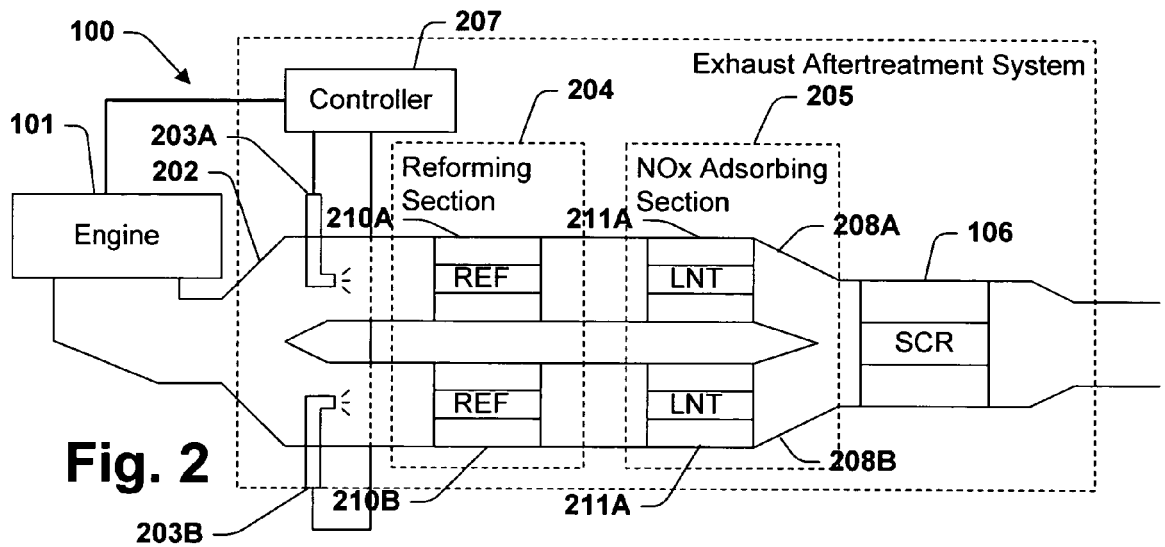
FIG. 2 is a schematic illustration of an exemplary power generation system having two branches.

FIG. 2 is a schematic illustration of exemplary power generation system 200, which is another exemplary power generation system in which the inventors' concepts can be implemented. In the power generation system 200, the exhaust from the engine 101 is passed to an exhaust line 202 that divides into branches 208A and 208B. The branch 208A is supplied by exhaust line fuel injector 203A and contains a fuel processor 210A and a LNT 211A. The branch 208B is supplied by exhaust line fuel injector 203B and contains a fuel processor 210B and a LNT 211B. The branches unite upstream from the SCR catalyst 106. In terms of rhodium utilization, the fuel reforming section 204 is considered to include both fuel processor 210A and fuel processor 210B. Likewise, the NOx adsorbing section is considered to include both LNT 211A and LNT 211B. If the LNTs 211A and 211B are regenerated alternately, the branched structure may improve LNT regeneration efficiency as the exhaust will naturally divert to some degree away from the branch being regenerated. The utilization of ammonia in the SCR 106 may also be improved by maintaining a lean environment in the SCR 106 as the LNTs are being regenerated and by distributing the supply of ammonia more evenly over time.

Figure 3:
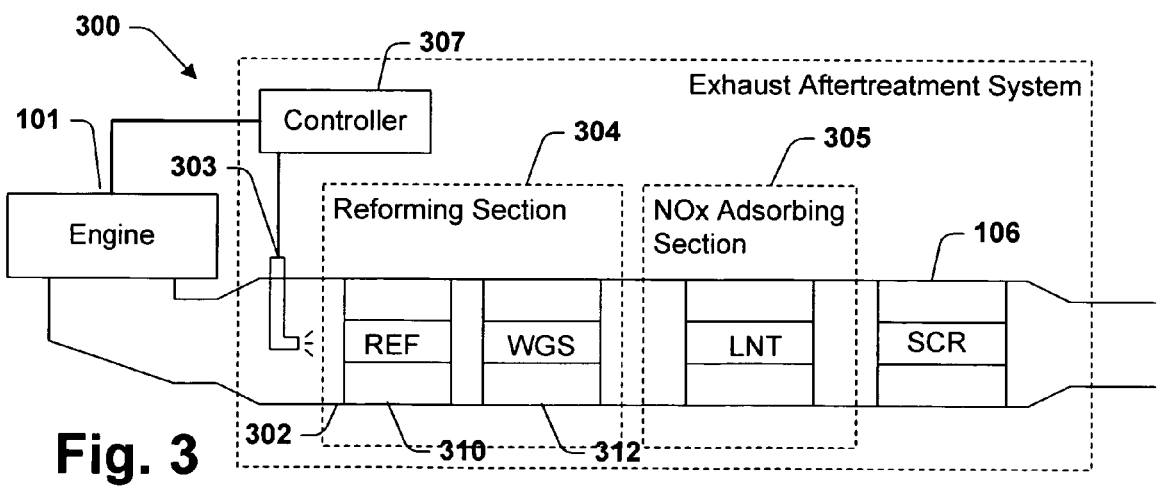
FIG. 3 is a schematic illustration of an exemplary power generation system having a reformer with reforming and water-gas shift catalyst in differing locations.

FIG. 3 is a schematic illustration of an exemplary power generation system 300, which is yet another exemplary power generation system in which the inventors' concepts can be implemented The power generation system 300 differs the power generation system 100 in the fuel reforming section 304. The fuel reforming section 304 comprises a separate water-gas shift (WGS) catalyst 312 downstream from a fuel reforming catalyst 310. In one embodiment, the WGS catalyst is integrated into a diesel particulate filter (DPF).

Figure 4:
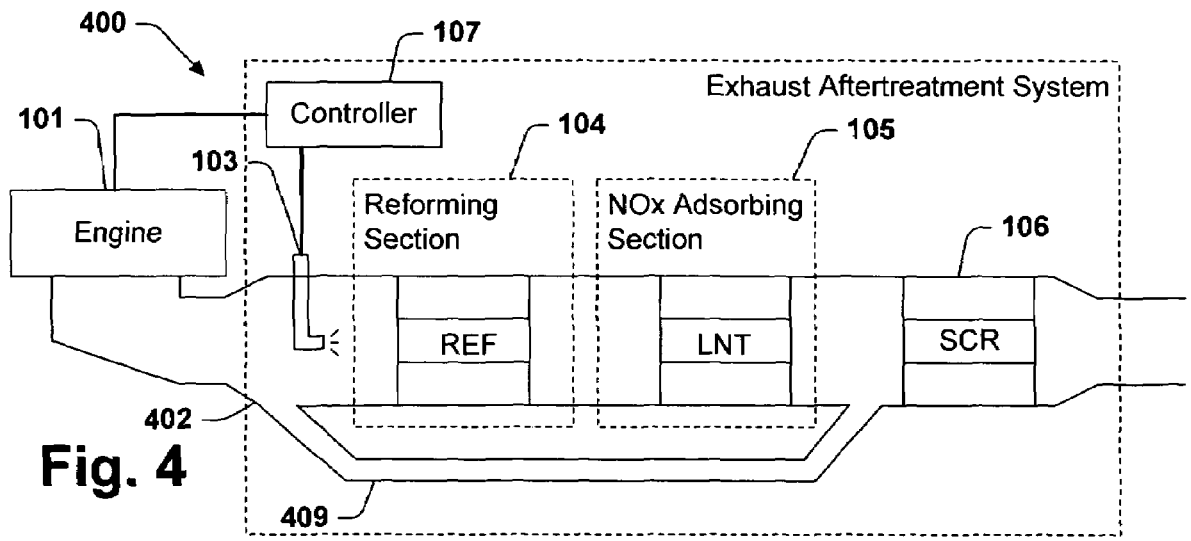
FIG. 4 is a schematic illustration of an exemplary power generation system having a partial bypass line.

FIG. 4 is a schematic illustration of an exemplary power generation system 400, which is still another exemplary power generation system in which the inventors' concepts can be implemented. The power generation system 400 differs from the power generation system 100 in the structure of the exhaust line 402. The exhaust line 402 provides a partial bypass 409 to the fuel reforming section 104 and the NOx adsorbing section 105. The bulk of the exhaust from the engine 101 is still channeled to the fuel reforming section 104. The small amount of flow through the bypass line 409 assures the SCR catalyst 106 a continuous supply of NOx-containing exhaust, whereby ammonia produced by the LNTs of the NOx adsorbing section 105 does not remain in the SCR catalyst 106 for an overly long time prior to being used. If the ammonia is not used quickly enough, it may decompose. The reduced flow to the reforming section 104 and the NOx adsorbing section 105 improves the efficiencies of these sections.

All the systems described herein can provide effective NOx mitigation. Preferably, at least about 80% of the NOx from the engine 101 is reduced, more preferably at least about 90%. Preferably, the reductions are sufficient to meet prevailing emissions control requirements.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of operating a diesel power generation system, comprising:

operating a diesel engine to produce lean $NO_x$-containing exhaust, wherein the diesel engine has a maximum displacement that is at least about 4 liters;

channeling at least the bulk of the exhaust from the diesel engine through one or more fuel reformers;

channeling the exhaust from the one or more fuel reformers through one or more LNTs containing rhodium;

initiating a lean warm-up phase in which fuel is injected into at least a portion of the exhaust downstream from the engine in such a manner that the injected fuel combusts in at least one of the fuel reformers under lean conditions, heating the fuel reformer;

initiating a rich regeneration phase in which fuel is injected into the exhaust in such a manner that the exhaust within the at least one fuel reformer is net rich, whereby a significant portion of the injected fuel undergoes steam reforming in the at least one fuel reformer and the at least one fuel reformer produces a reformate-containing exhaust that regenerates at least one of the LNTs;

wherein at least about 80% of the stored $NO_x$ removed from the LNTs during the rich regeneration phase is converted to products selected from the group consisting of $N_2$ and $NH_3$;

wherein the regeneration takes place with the at least one LNT at an initial temperature of about 275° C. or less;

the fuel reformers collectively have no more than about 0.5 grams rhodium per liter maximum displacement of the diesel engine;

the fuel reformers comprises effect amounts of precious metal catalyst for catalyzing steam reforming at 600° C.;

the reformate-containing exhaust comprises at least about a 3:2 hydrogen to carbon monoxide ratio; and the total rhodium content of the fuel reformers collectively is between 1.5 and 4 times the total rhodium content of the LNTs collectively.

2. The method of claim 1, wherein:

at least about 30% of the stored $NO_x$ removed from the LNTs during the rich regeneration phase is converted to $NH_3$, which is passed on to one or more ammonia SCR catalysts configured downstream from the LNTs; and none of the LNTs are downstream from the one or more ammonia SCR catalysts.

3. The method of claim 1, wherein at least about 50% of the stored NOx removed from the LNTs during the rich regeneration phase is converted to $NH_3$, which become stored in one or more ammonia SCR catalysts downstream from the LNTs.

4. The method of claim 1, wherein the reformate-containing exhaust comprises at least about 3% hydrogen.

5. The method of claim 1, wherein the overall phi value for the net rich exhaust within the fuel reformer is maintained at or below about 1.40 and the temperature within the fuel reformer is maintained from about 500 to about 625° C.

6. The method of claim 1, wherein the LNTs collectively comprise at least about 0.10 grams rhodium per liter maximum displacement of the diesel engine.

7. The method of claim 1, wherein the 3:2 hydrogen to carbon monoxide ratio is achieved while the exhaust is at a temperature of at least about 500° C.

8. The method of claim 1, wherein the exhaust is at about 275° C. or less before it enters the heated fuel reformer.

9. The method of claim 1, wherein the fuel reformers collectively have a catalyst volume that is no more than about 0.75 liters per liter maximum displacement of the diesel engine.

10. The method of claim 1, wherein the fuel reformers collectively have a catalyst volume that is no more than about 0.6 liters per liter maximum displacement of the diesel engine.

11. The method of claim 1, wherein the LNTs collectively have a catalyst volume that is no more than about 2.0 liters per liter maximum displacement of the diesel engine.

12. The method of claim 1, wherein the LNTs have been aged by at least 50 desulfations at temperatures in excess of 700° C.

13. The method of claim 12, wherein the LNTs are effective to remove at least about 80% of the NOx from the exhaust during a lean phase immediately following the rich phase.

14. A diesel power generation system, comprising:

a diesel engine having a maximum displacement that is at least about 4 liters and is operative to produce lean NOx-containing exhaust;

one or more fuel reformers configured to receive the exhaust from the diesel engine, the fuel reformers collectively having no more than about 0.5 grams rhodium per liter maximum displacement of the diesel engine, but nevertheless comprises precious metal catalyst in an effect amount for catalyzing nearly auto-thermal reforming of diesel fuel to convert at least about 50% of the diesel fuel in excess of stoichiometric concentration to $H_2$ and CO when the reformer is at 600° C. and the diesel fuel is provided to the reformer at a 1.2:1.0 overall fuel to air ratio, the fuel reformers collectively having a supported catalyst volume that is no more than about 70% the maximum displacement of the diesel engine;

one or more LNTs configured to receive the bulk of the exhaust from the one or more fuel reformers, the LNTs comprising rhodium in an amount such that the total rhodium content of the fuel reformers collectively is between 1.5 and 4 times the total rhodium content of the LNTs collectively;

one or more SCR catalysts configured to adsorb and store ammonia produced by the one or more LNTs during regeneration; and one or more fuel injectors configured to selectively inject diesel fuel into the exhaust downstream from the engine, but upstream from the one or more fuel reformers.

15. The diesel power generation system of claim 14, further comprising one or more controllers configured to regulate fuel injection through the one or more fuel injectors during regeneration of the one or more LNTs in order to provide an overall rich exhaust composition while limiting the overall fuel to air ratio of the enriched exhaust and the temperature at which the fuel is reformed in such a manner that the fuel reformers produce reformate containing exhaust that comprises at least about 3% hydrogen or at least about 2% hydrogen in combination with a hydrogen to CO ratio of at least about 3:2.

16. The diesel power generation system of claim 14, wherein the one or more LNTs are all upstream from all the one or more SCR catalysts.

17. The diesel power generation system of claim 14, wherein the one or more fuel reformers, the one or more LNTs, and the one or more SCR catalysts are all configured within an exhaust conduit that is free from valves or dampers.

18. The diesel power generation system of claim 14, wherein:

the fuel reformers collectively have a catalyst volume that is no more than about 0.75 liters per liter maximum displacement of the diesel engine.

the LNTs collectively have a catalyst volume that is no more than about 2.0 liters per liter maximum displacement of the diesel engine; and the LNTs collectively comprise from about 0.25 to about 0.35 grams rhodium per liter maximum displacement of the diesel engine.

* * * * *